US008482559B2

(12) United States Patent
Buchner et al.

(10) Patent No.: US 8,482,559 B2
(45) Date of Patent: Jul. 9, 2013

(54) METHOD AND APPARATUS FOR TRIANGLE TESSELLATION

(75) Inventors: Brian A. Buchner, Oviedo, FL (US); Vineet Goel, Winter Park, FL (US)

(73) Assignee: ATI Technologies ULC, Markham, Ontario (CA)

( * ) Notice: Subject to any disclaimer, the term of this patent is extended or adjusted under 35 U.S.C. 154(b) by 1738 days.

(21) Appl. No.: 10/287,143

(22) Filed: Nov. 4, 2002

(65) Prior Publication Data

US 2004/0085312 A1    May 6, 2004

(51) Int. Cl.
*G06T 15/30* (2011.01)
*G06T 17/20* (2006.01)

(52) U.S. Cl.
USPC ........................................................ 345/423

(58) Field of Classification Search
USPC .................................. 345/643, 423
See application file for complete search history.

(56) References Cited

U.S. PATENT DOCUMENTS

| | | | |
|---|---|---|---|
| 4,099,259 A * | 7/1978 | Parsons et al. ................ | 345/559 |
| 4,912,659 A * | 3/1990 | Liang ............................ | 345/505 |
| 5,432,892 A * | 7/1995 | Hafner et al. ................. | 345/591 |
| 5,724,561 A * | 3/1998 | Tarolli et al. ................. | 345/561 |
| 5,821,940 A   | 10/1998 | Morgan et al. | |
| 6,003,038 A * | 12/1999 | Chen ......................... | 707/103 R |
| 6,078,331 A   | 6/2000 | Pulli et al. | |
| 6,314,490 B1 * | 11/2001 | Morein ............................. | 711/3 |
| 6,433,786 B1 * | 8/2002 | Jones, Jr. ...................... | 345/544 |
| 6,462,738 B1 * | 10/2002 | Kato ............................. | 345/428 |
| 6,697,063 B1 | 2/2004 | Zhu | |
| 6,819,325 B2 | 11/2004 | Boyd et al. | |
| 6,965,908 B2 | 11/2005 | Shaw | |
| 2003/0051043 A1 * | 3/2003 | Wyschogrod et al. ........ | 709/230 |
| 2004/0085312 A1 | 5/2004 | Buchner et al. | |
| 2006/0050072 A1 | 3/2006 | Goel | |

FOREIGN PATENT DOCUMENTS

EP    0930582 A2    7/1999

OTHER PUBLICATIONS

Alex Vlachos, Jorg Peters, Chas Boyd, Jason L. Mitchell, Curved PN Triangles, 2001 Symposium on Interactive 3D Graphics, Mar. 19-21, 2001, ACM Sigraph, ISBN: 1-58113-292-1, pp. 159-166.*
Alex Vlachos, Jörg Peters, Chas Boyd, Jason L. Mitchell, "Curved PN triangles,"Mar. 2001, Proceedings of the 2001 symposium on Interactive 3D graphics, p. 159-166.*
Alex Vlachos, Jörg Peters, Chas Boyd, Jason L. Mitchell, "Curved PN triangles," Mar. 19, 2001, Proceedings of the 2001 Symposium on Interactive 3D Graphics, p. 159-166.*
"TRUFORM White Paper," May 2001, ATI Technologies White Paper.*

\* cited by examiner

*Primary Examiner* — David T Welch
(74) *Attorney, Agent, or Firm* — Faegre Baker Daniels LLP (57) ABSTRACT

Tessellation triangles, which are used to model three-dimensional surfaces in computer-generated graphics, can be more efficiently calculated by retrieving tessellation triangle vertices and Bezier-function coefficients using a single, two-part address.

20 Claims, 7 Drawing Sheets

FIG. 1

PRIOR ART

SUPER-PRIM INDICES - 222

| | VERTEX 1 | VERTEX 2 | VERTEX 3 | |
|---|---|---|---|---|
| 0 | 0 | 1 | 2 | TRIANGLE 1 |
| 1 | 3 | 4 | 5 | TRIANGLE 2 |
| 2 | 6 | 7 | 8 | TRIANGLE 3 |
| 3 | | | | |
| | | | | |
| | | | | |
| | | | | TRIANGLE 10 |

FIG. 6

DUEL-INDEX STORAGE/RETRIEVAL OF TESSELLATION TRIANGLE VERTICES

| INDEX TO SUPERPRIM INDEX ARRAY (222 of FIG. 3) | INDEX TO TESSELATION WEIGHT ARRAY (216 OF FIG. 3) | |
|---|---|---|
| 0 | W0 | ⎫ |
| 0 | W1 | |
| 0 | W2 | ⎬ TRIANGLE 1 |
| 0 | W3 | |
| 0 | W4 | |
| 0 | W5 | ⎭ |
| 1 | W0 | ⎫ |
| 1 | W1 | |
| 1 | W2 | ⎬ TRIANGLE 2 |
| 1 | W3 | |
| 1 | W4 | |
| 1 | W5 | ⎭ |

230

METHOD AND APPARATUS FOR TRIANGLE TESSELLATION

BACKGROUND OF THE INVENTION

The graphical quality of computer games has improved from blocky computer-generated images to more life-like three-dimensional images. Three-dimensional objects are usually represented by groups of connected triangles which collectively appear to form a surface of a virtual object. Among other things, each triangle in a virtual object is defined by three vertices and three normals. As is known in the art, each vertex of a triangle used to model a three-dimensional surface is specified by an X, Y and a Z coordinate.

As computer graphic applications (programs) require more detailed and more realistic three-dimensional images, the number of triangles required to represent each scene increases. As the number of triangles increases, the limit to graphics processing capability frequently becomes a bandwidth limitation of the data bus that connects the CPU (the central processor unit of a computer system on which the graphic application is running) to the Graphics Processing Unit (GPU).

Figure 1:
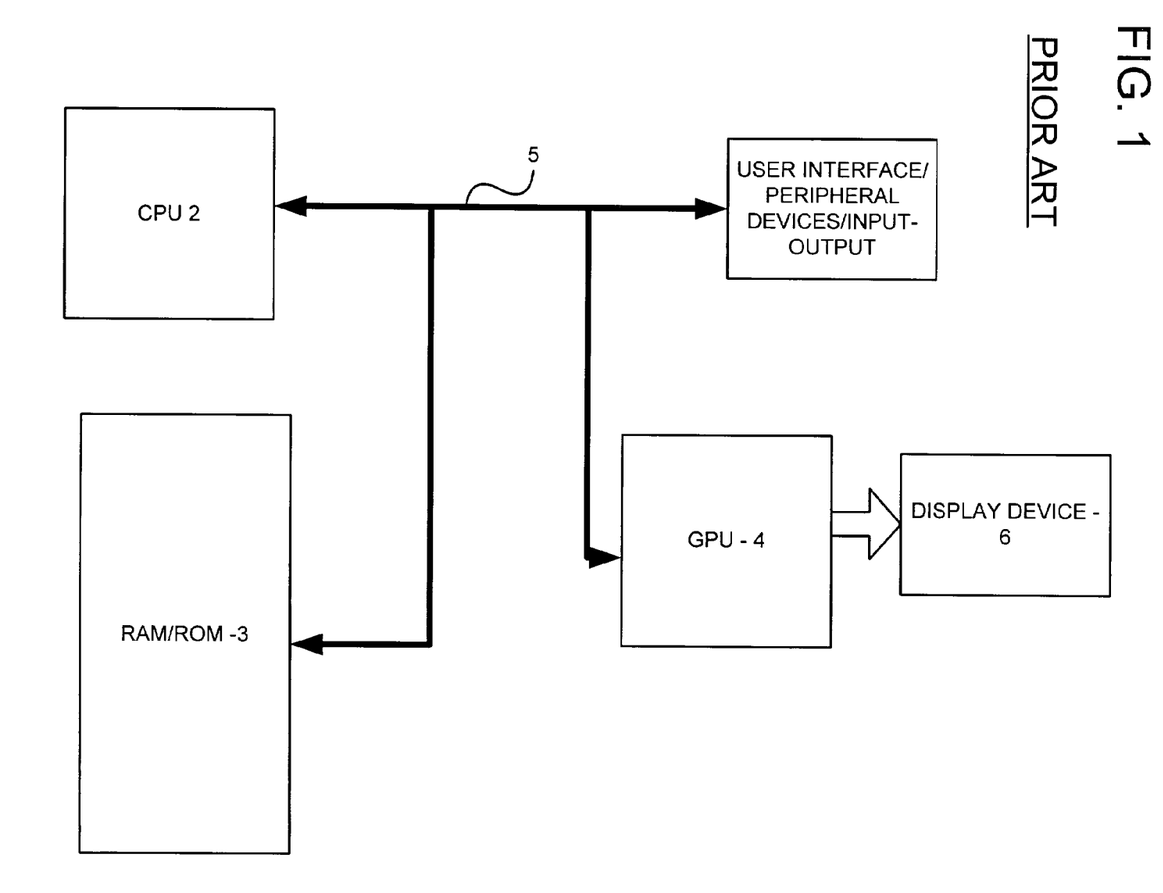
FIG. 1 is a block diagram of a prior art computer having a central processor (CPU) and a graphics processor (GPU) that communicate via a bus.

FIG. 1 depicts a computer system having a CPU 2 such as a microprocessor or microcontroller. The CPU 2 executes instructions stored in RAM and/or ROM 3 and it is coupled to a GPU 4 over a system bus 5. The GPU 4 provides graphics processing capability to the CPU 2 and the GPU 4 output is provided to a display 6, typically a CRT or LCD display device (not shown for clarity).

An alternate approach to overcome bus bandwidth limitations yet provide more realistic graphics is to use some form of a higher-order surface to represent three-dimensional objects, rather than planar triangles. A higher-order surface defines a three-dimensional, curved, surface with a compact representation. One such higher-order surface is known as Point Normal Triangles or PN Triangles. Current GPU art does not provide native support for the processing and display of higher-order surfaces. A process known as tessellation can be performed on higher-order surfaces to decompose the higher-order surfaces into a mesh of planar, triangular surfaces, said surfaces approximating the actual higher-order surface. In order for this tessellation process to be of benefit in reducing the bandwidth constraint described earlier, it must be provided by and therefore "exist" on the GPU. In such a system, the CPU will transfer higher-order surface data to the GPU over the CPU to GPU data bus. The GPU will then tessellate the higher-order surfaces into triangles that approximate the surfaces. The triangles then become input to standard GPU resources that cause the approximated higher-order surfaces to be displayed.

The amount or degree to which a triangle is tessellated into smaller triangles is known as a tessellation level. Discrete tessellation requires that all triangles be divided (tessellated) into a fixed number of similar triangles (equally spaced in barycentric coordinate space). The higher the tessellation level, the more tessellated triangles generated and the more accurate the surface approximation, however, higher tessellation comes at the expense of processing resources. The discrete nature of the tessellation means that switching tessellation levels for a given surface from one display frame to the next will result in a significant change in the object's appearance—a change that is likely to be visually unacceptable.

Continuous tessellation provides for smoothly varying amounts of tessellation between discrete tessellation levels. In general, the triangles resulting from continuous tessellation are not similar, and are not equally spaced in barycentric coordinate space.

Curves in space can be represented by a Bezier curve, which provides a mathematical model of a curve. As is known, a Bezier curve has first and second end points and control points; it is the control points that define curvature proximate to the control points. A cubic Bezier curve has four control points: one for each end point and two control points inside the curve. The concept of the Bezier curve can be extended to construct a Bezier surface in which surface curvature is described using control points. A problem with tessellating triangles in order to provide more life-like surface modeling is the computational power required to evaluate a Bezier function, or other curved-surface model. A method and apparatus by which a higher-order surface can be efficiently tessellated so as to more quickly model a graphical surface would be an improvement over the prior art.

DETAILED DESCRIPTION OF A PREFERRED EMBODIMENT

The process of tessellating a higher-order surface requires the calculation of a Bezier function. The cubic Bezier function is expressed as:

$$Pos(u, v, w) = \sum_{i+j+k=3} \frac{6}{i!j!k!} P_{ijk} u^i v^j w^k$$

where $i, j, k >= 0$ and $i, j, k <= 3$ $$Norm(u, v, w) = \sum_{i+j+k=2} \frac{2}{i!j!k!} N_{ijk} u^i v^j w^k$$

where $i, j, k >= 0$ and $i, j, k <= 2$

In a preferred embodiment, the foregoing equations are calculated by the computation of:

$$Pos(u, v, w) = uP_0 + vP_1 + wP_2 - vw\left(\frac{1}{2}u + w\right)n_0(n_0 \cdot E_0) +$$

$$wv\left(\frac{1}{2}u + v\right)n_1(n_1 \cdot E_0) - uv\left(\frac{1}{2}w + v\right)n_1(n_1 \cdot E_1) +$$

$$vu\left(\frac{1}{2}w + u\right)n_2(n_2 \cdot E_1) - wu\left(\frac{1}{2}v + u\right)n_2(n_2 \cdot E_2) +$$

$$uw\left(\frac{1}{2}v + w\right)n_0(n_0 \cdot E_2)$$

-continued $$Norm(u, v, w) = un_0 + vn_1 + wn_2 - \frac{1}{2}vw\frac{E_0((n_0+n_1)\cdot E_0)}{|E_0|^2} - \frac{1}{2}uv\frac{E_1((n_1+n_2)\cdot E_1)}{|E_1|^2} - \frac{1}{2}wu\frac{E_2((n_2+n_0)\cdot E_2)}{|E_2|^2}$$

Where $P_0$, $P_1$, $P_2$ and $n_0$, $n_1$, $n_2$ are the PN triangle's position and normal values respectively and where $e_0$, $e_1$, $e_2$ are the PN triangle's three edges.

Here, weighting factors:

weight[0]=u weight[1]=v weight[2]=w $$\text{weight}[4] = -vw\left(\frac{u}{2}+w\right)$$

$$\text{weight}[5] = wv\left(\frac{u}{2}+v\right)$$

$$\text{weight}[6] = -uv\left(\frac{w}{2}+v\right)$$

$$\text{weight}[7] = vu\left(\frac{w}{2}+u\right)$$

$$\text{weight}[8] = -wu\left(\frac{v}{2}+u\right)$$

$$\text{weight}[9] = uw\left(\frac{v}{2}+w\right)$$

are used for the position interpolation and weighting factors:

weight[0]=u weight[1]=v weight[2]=w $$\text{weight}[10] = -\frac{vw}{2}$$

$$\text{weight}[11] = -\frac{uv}{2}$$

$$\text{weight}[12] = -\frac{wu}{2}$$

are used for the normal interpolation.

At a given tessellation level, a set of (u,v,w) coordinates is selected that represent the positions at which to evaluate the Bezier function, i.e., these are the positions of the subvertices chosen to approximate the surface. Factoring out the vertex positions and normals from the resulting equations leaves a set of weights, as described in the above equations, one set of weights for each u,v,w position chosen, that are constant for all point normal triangles (hereafter "PNTs") that are to be tessellated at a particular tessellation level. Thus, these weights need only be calculated once for a tessellation level.

Evaluation of each new, tessellated, vertex therefore requires as input data, the original three vertices of the point normal triangle (hereafter, "PNT") and the set of weights pre-calculated for the u,v,w position of the new, tessellated, vertex. Original vertex data, in general, is unique for each new PNT to be tessellated. Evaluation weights, however, as described above, are dependent only on tessellation level, hence a single collection of tessellation weights may be used repeatedly to process any number of PNTs, given each PNT is to be processed at the same tessellation level.

By using a two-part address, one part of which points to the location of the weights in memory and a second part of which points to the location of the indices of triangles to be tessellated, the source data for each tessellated vertex may be efficiently retrieved, or fetched, from the main memory for the system on which a graphic's program is running, which is also referred to herein as "CPU memory." After the tessellation weights for a particular tessellation function (e.g., a Bezier function) are retrieved from memory, they are provided to a graphics processor that calculates the vertices of tessellation triangles. The vertices of tessellation triangles are calculated for a particular level of tessellation using the same coefficient weights. The indices of a triangle to be tessellated are retrieved by a separate part of the same address so that the position and normal coordinates of the higher-order surface to be tessellated can also be provided directly to the graphics processor.

Figure 2A:
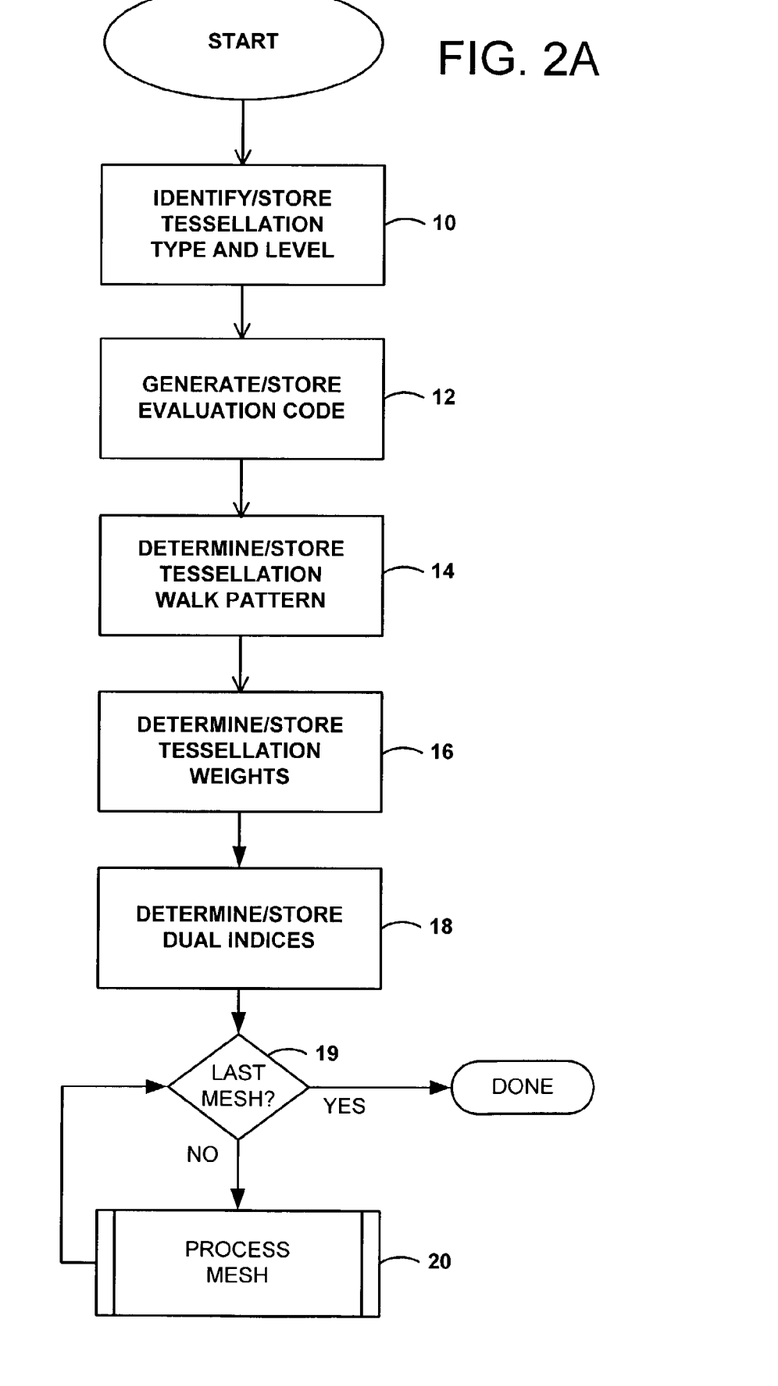
FIGS. 2A and 2B are a block diagram depiction of a method for tessellating a higher-order surface.

FIG. 2A shows a block diagram depiction of a method for tessellating a higher-order surface that is used to model a graphical surface.

In Step 10, a tessellation level and type are determined and identified to a graphics processor unit, such as the GPU 4 of FIG. 1. The tessellation type describes the higher-order surface type and degree, e.g., cubic Bezier. The tessellation level represents the amount of tessellation to be performed. Higher values indicate more tessellated triangles and more accurate surface approximation. Tessellation level may be either discrete or continuous.

Figure 3:
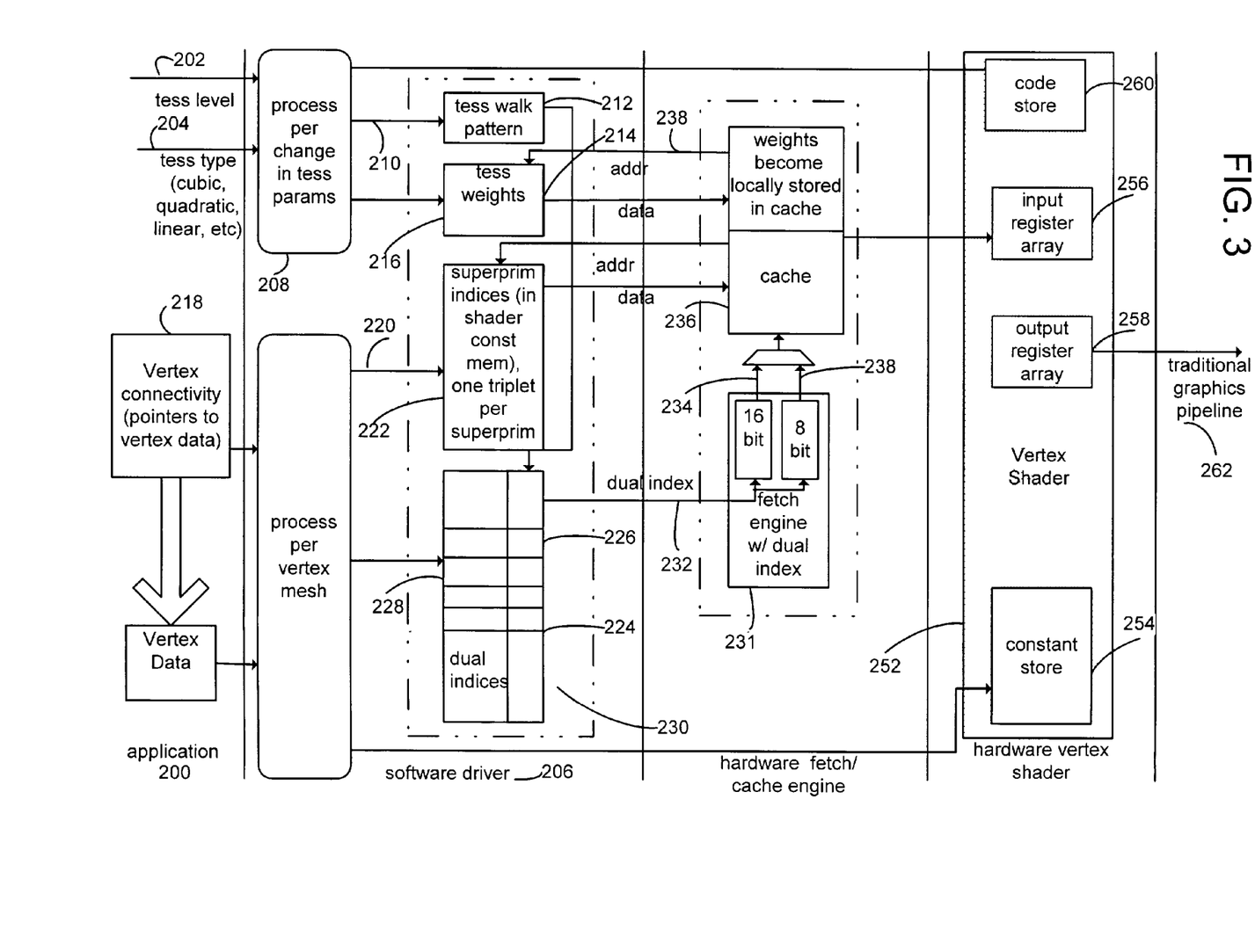
FIG. 3 is a block diagram of a graphics processor unit for tessellating higher-order surfaces used to model a graphic surface.

In Step 12, code to execute the Bezier evaluation functions noted above is generated and stored in the hardware vertex shader code store, identified by reference numeral 260 in FIG. 3.

In step 14, a tessellation walk pattern is specified or determined. A "walk pattern" is a sequence or order by which the tessellation triangles are calculated for a given tessellation level.

In step 16, tessellation weights which are used in the evaluation of a PNT and Bezier function evaluation (used to calculate tessellated triangle vertices) are specified. Those of ordinary skill in the art will recognize that linear, quadratic, cubic and higher-order Bezier functions require the calculation of different weight coefficients. The weights are determined by tessellation level, which uniquely determines the set of u,v,w positions at which the Bezier function will be evaluated.

At step 18, sufficient dual-indices are generated and stored to process a maximally sized vertex mesh at the given tessellation level. Each dual index will subsequently control the data fetching and evaluation of one tessellated vertex. The dual index is of two parts, an index to the superprim vertex index data structure and an index into the tessellation weights data structure.

By executing a loop comprised of steps 19 and 20, the subvertices are calculated for all tessellation triangles. The method of tessellating a triangle of step 20 is shown in greater detail in FIG. 2B.

Figure 2B:
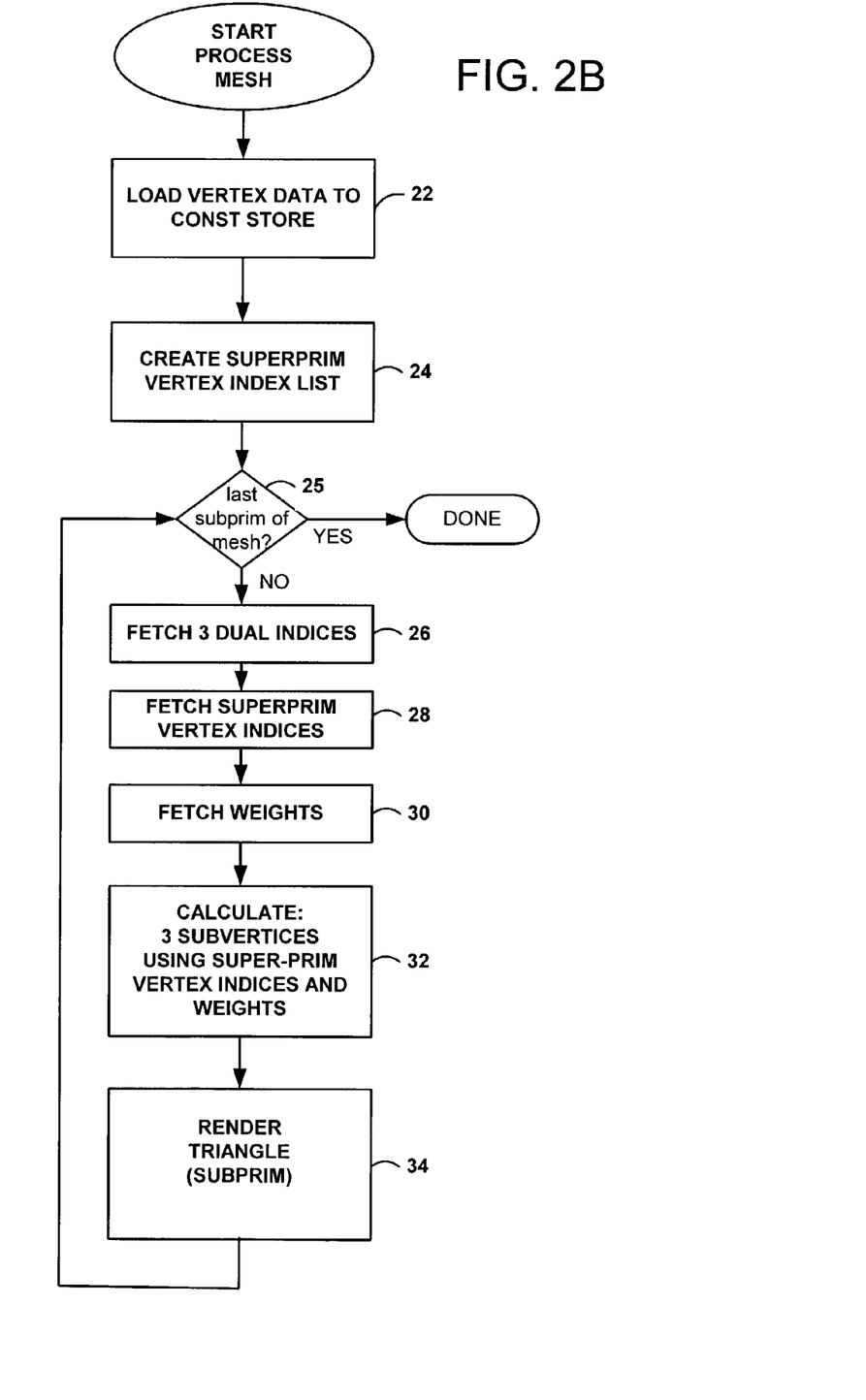

In step 22, the vertices of a triangle to be tessellated are loaded by the video graphics processor driver into constant store 254 of the vertex shader 252.

In step 24 a list of superprim vertex indices is created. Each entry in the list consists of three index values, each of which points to the vertex data that was loaded in step 22.

In step 25 a test is performed to determine if the processing of the current mesh is complete. If it is not processing continues with step 26.

In step 26, three dual index values are fetched (sufficient to create one tessellated triangle)

In step 28, one component of each of the three dual indices is used to fetch an entry from the super-vertex index list, a data structure in the computer system's main memory, identified in FIG. 1 by reference numeral 3.

In step 30, the second component of each of the three dual indices is used to fetch an entry from the tessellation weighting factors, a data structure in the computer system's main memory, identified in FIG. 1 by reference numeral 3. When multiple PNTS are tessellated to the same tessellation level, the same weighting factors are repeatedly used in the calculation of the Bezier equation. For this reason, and by virtue of a GPU local memory cache mechanism (reference 236 of FIG. 3), it is possible to retrieve the weighting factors just once from the CPU main memory and then subsequently retrieve them from the cache, avoiding use of the system memory bus (reference 5 of FIG. 1)In step 32, the subvertices of a sub-primitive are calculated using the superprimitive indices and weighting factors retrieved in Steps 28 and 30.

In step 34, the planar triangle defined by the three subvertices created in step 32 is rendered. Program control loops back to step 25 with the aforementioned steps repeated until the last subprimitive is calculated.

FIG. 3 depicts a graphics processor for tessellating higher-order surfaces as well as the inputs it receives from the applications program and graphics processor driver, using the steps depicted in FIG. 2. In FIG. 3, a computer program or other application 200 identifies a tessellation level 202 and a tessellation type 204 to a software driver 206

Using the tessellation level 202 and the tessellation type 204, the software driver 206 calculates 208 a tessellation walk pattern 210 that is stored in memory 212.

In addition to calculating a tessellation walk pattern, the software driver 206 calculates tessellation weights, to be used to calculate the subvertices. These tessellation weights 214 are stored in a data array 216 for subsequent processing.

The actual vertices of superprimitives are provided to the software driver 206 as well as connectivity information defining sets of three vertices, each set forming a single PNT. This vertex connectivity data 218 is used to calculate indices 220 to the superprimitives that are stored an array 222.

The tessellation walk pattern 210 and indices to the superprimitive (also known as a "superprim") indices in array 222 of the higher-order surfaces to be tessellated are stored in an array 224 as two-part addresses. A first address component 226 points to tessellation weights in array 216 and a second address component 228 points to vertex indices as stored in array 222.

The memory arrays 224, 222, 216 and 212 are all part of a memory structure or memory device 230 that provides the ability to individually address and retrieve data in semiconductor memory. These memories 224, 222, 216 and 212 are preferably part of a main memory, such as the memory identified in FIG. 1 by reference numeral 3 and not part of the GPU 4. The vertex shader 252 is preferably embodied as a processor, such as digital signal processor but also possibly using a microprocessor or microcontroller.

The location of the tessellation weights 216, and the indices of the higher-order surface to be tessellated are specified by the dual address components 226 and 228. In order to more efficiently calculate tessellation triangles, and their associated indices, a dual-address fetch engine 231, which can be implemented using a microprocessor, microcontroller, digital signal processor or combinational logic, among other things, retrieves the address of the tessellation weights and the address of the superprimitive indices as a single, dual-index address 232. In their preferred embodiment, 16 bits of information identify the address whereat the indices of a superprimitive can be located in memory. These 16 bits 234 are sent to a cache memory controller 236 which retrieves from memory, the indices of a PNT's three vertices.

In the preferred embodiment, another eight bits of address 238 are provided to the cache memory controller 236 which retrieves from memory, the tessellation weights 214 by way of the eight address bits 238 passed to the cache memory controller 236.

The three vertex indices for the PNT and the set of weights (the data that was fetched) are stored in the input register array 256. When this is completed, using instructions in the code store 260, the tessellation evaluation process is executed using the three indices (which are in the input register array 256) to reference the three PNT original vertices as they are stored in the constant store 254. The process has direct access to the weights (also in the input register array 256). The process applies the weights to the original vertices (positions and normals) using the functions:

$$Pos(u, v, w) = uP_0 + vP_1 + wP_2 - vw\left(\frac{1}{2}u + w\right)n_0(n_0 \cdot E_0) +$$
$$wv\left(\frac{1}{2}u + v\right)n_1(n_1 \cdot E_0) - uv\left(\frac{1}{2}w + v\right)n_1(n_1 \cdot E_1) +$$
$$vu\left(\frac{1}{2}w + u\right)n_2(n_2 \cdot E_1) - wu\left(\frac{1}{2}v + u\right)n_2(n_2 \cdot E_2) +$$
$$uw\left(\frac{1}{2}v + w\right)n_0(n_0 \cdot E_2)$$
$$Norm(u, v, w) = un_0 + vn_1 + wn_2 - \frac{1}{2}vw\frac{E_0((n_0 + n_1) \cdot E_0)}{|E_0|^2} -$$
$$\frac{1}{2}uv\frac{E_1((n_1 + n_2) \cdot E_1)}{|E_1|^2} -$$
$$\frac{1}{2}wu\frac{E_2((n_2 + n_0) \cdot E_2)}{|E_2|^2}$$

The result of the calculations is a new vertex which is stored in an output register array 258. The output register array becomes the source of data for a standard or traditional graphics pipeline 262

Figure 4:
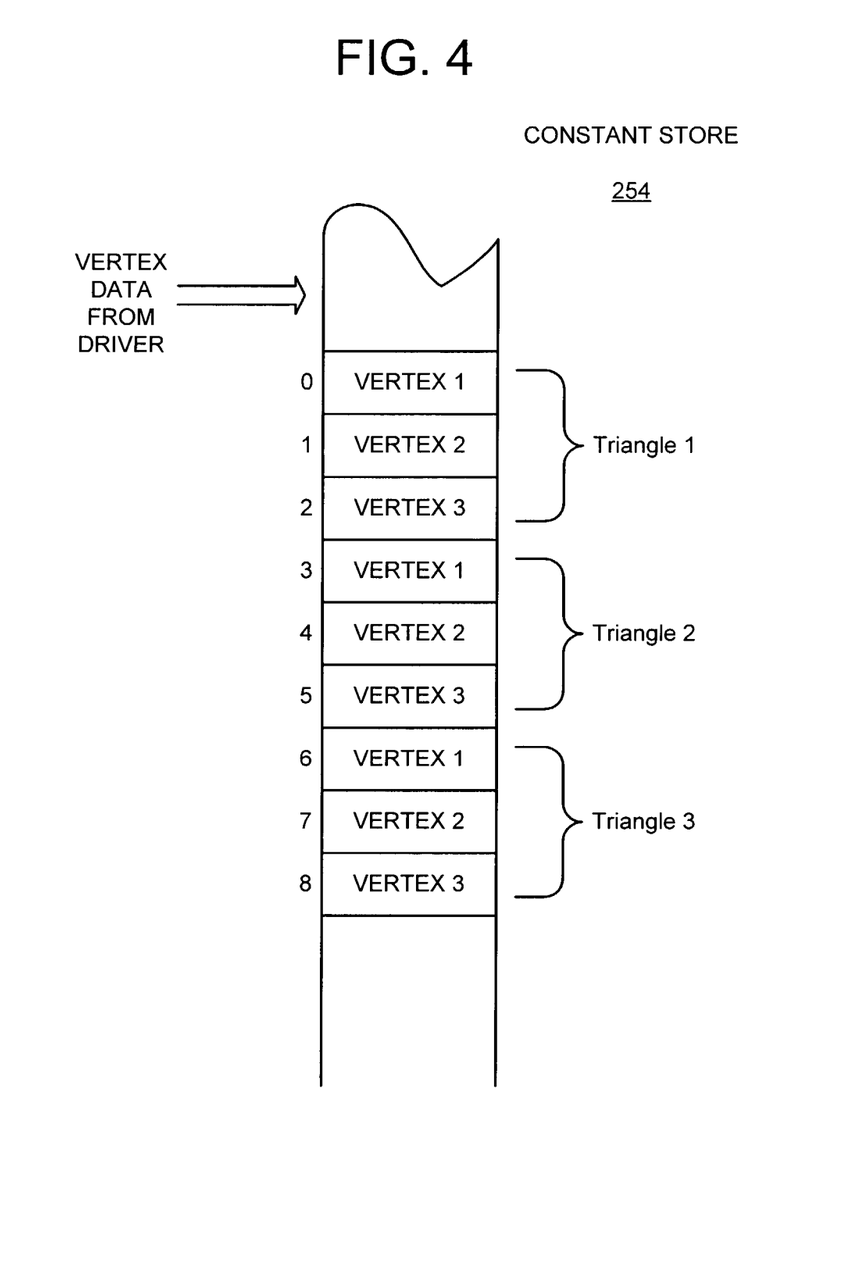
FIG. 4 depicts how vertices are stored in the constant store 254.

FIG. 4 depicts how vertices are stored in the constant store 254. In FIG. 4, vertex data for a particular triangle is shown as stored in adjacent memory locations, however, in general, the vertex data may be stored in non-adjacent locations, and multiple triangles may share vertices. Non-adjacency and sharing of vertices is possible because of the vertex connectivity information (reference 218 of FIG. 3).

Figure 5:
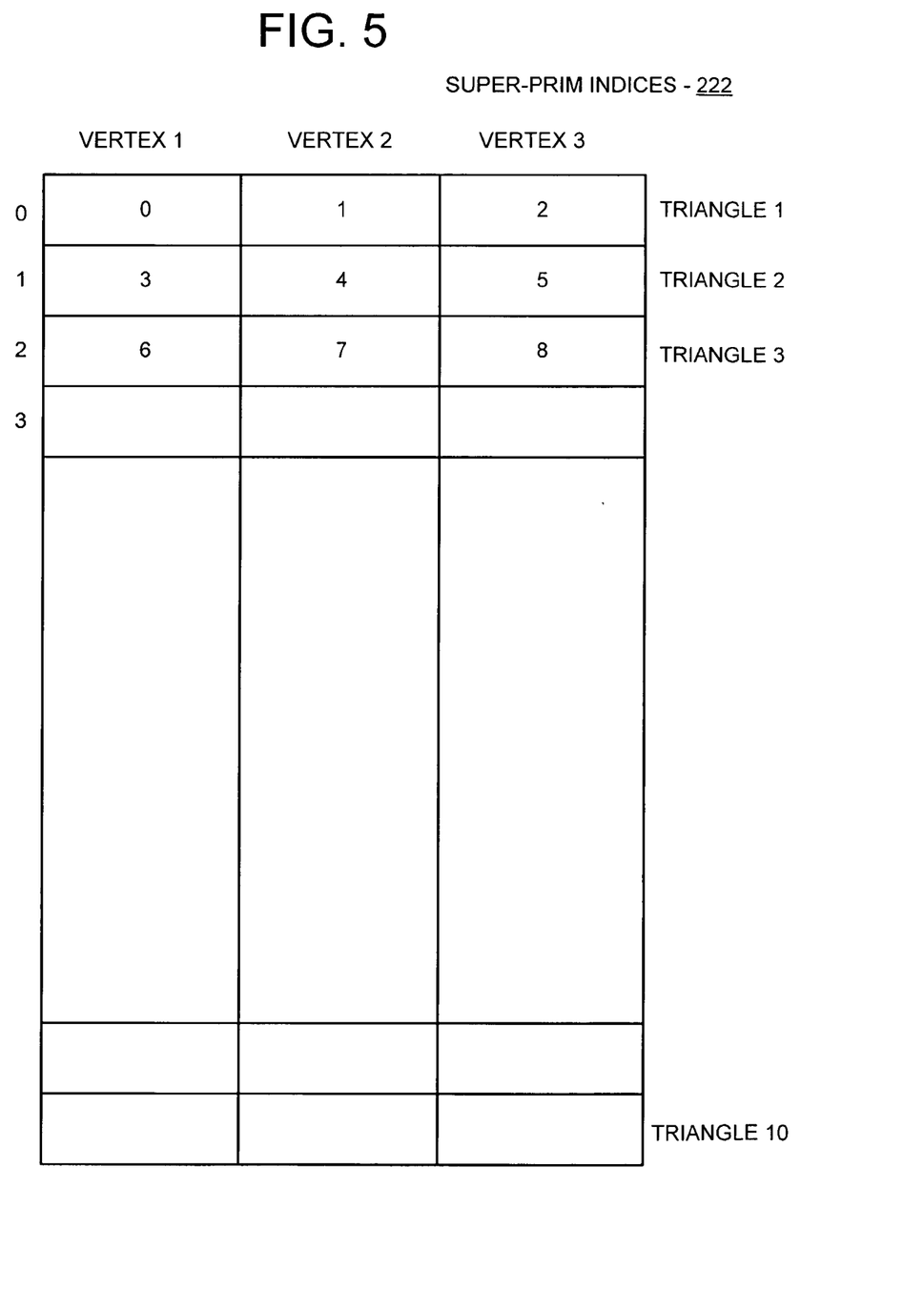
FIG. 5 shows the arrangement of a superprim index data structure.

FIG. 5 shows the arrangement of the data structure (also referred to herein as a memory array) known as the superprim indices store 222. Each row of the data structure superprim indices store 222 includes three components, each of which is a location in the constant store 254 where one vertex of a PNT to be tessellated is stored.

Figure 6:
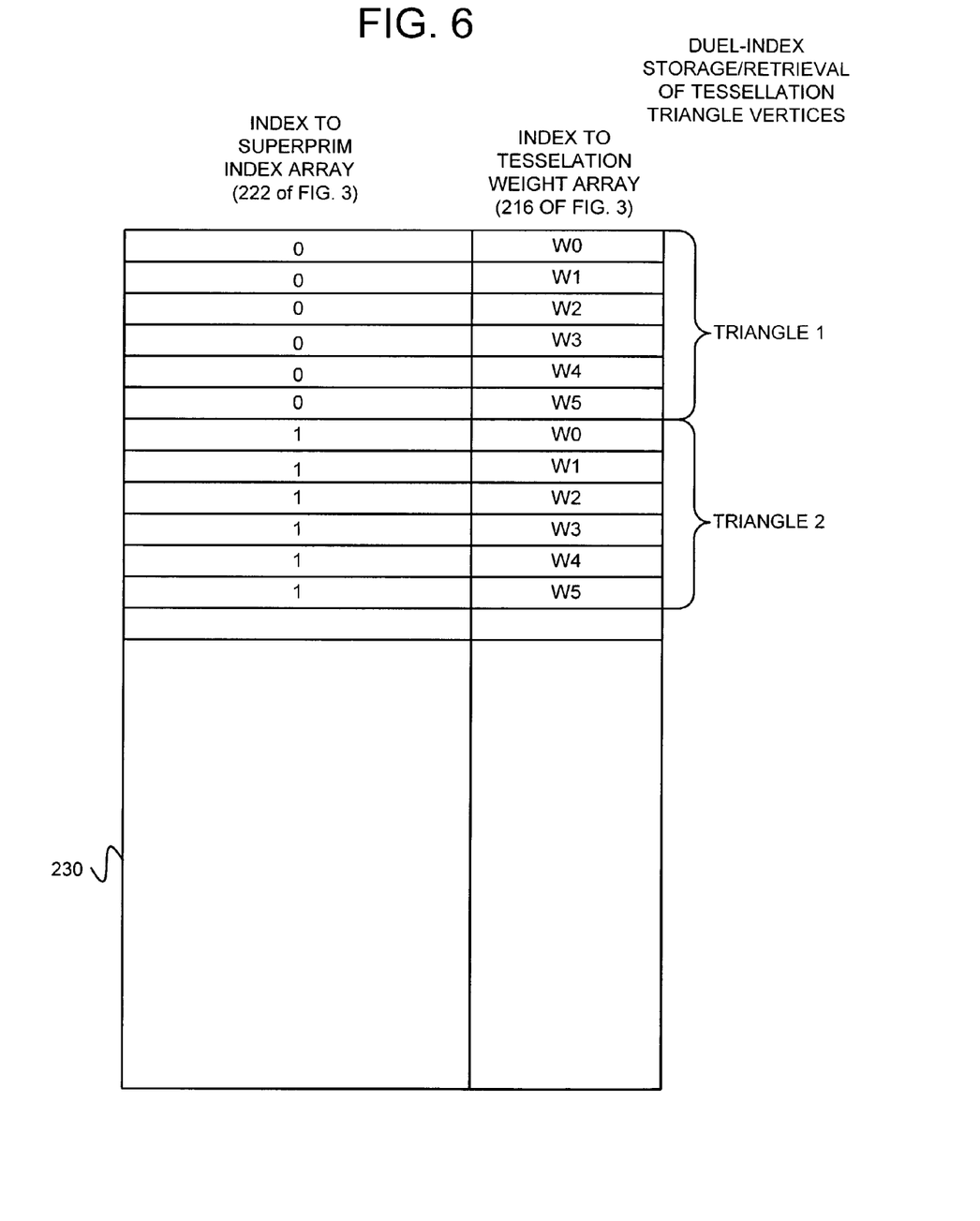
FIG. 6 shows the structure of a dual index data structure.

FIG. 6 shows the structure of the dual index data structure 230. Each entry in the dual index data structure is a pair of indices, the first pointing to a location in the superprim index list (222 of FIG. 3) and the second pointing to a location in the tessellation weights data structure (216 of FIG. 3).It should be apparent to those of skill in the art that the local storage and re-use of weighting factors in a GPU on a per-triangle, i.e., continuous tessellation, can improve modeling of three-dimensional surfaces without burdening the CPU-GPU bus.

What is claimed is:

1. A method of tessellating a higher-order surface that is used to model a graphical surface to produce a three-dimensional image, said method carried out by a processor that provides graphics processing capability, said method comprising:
   storing, by the processor that provides graphics processing capability, triangle-evaluation-function tessellation weighting factors;
   storing, by the processor that provides graphics processing capability, vertex indices of the higher-order triangular surface;
   retrieving, by the processor that provides graphics processing capability, triangle-evaluation-function tessellation weighting factors and vertex indices of the higher-order triangular surface using a dual-index address;
   calculating, by the processor that provides graphics processing capability, new vertices of a tessellation triangle for said higher-order triangular surface by evaluating said triangle-evaluation function using the vertices of the higher-order triangular surface and weighting values that are identified by the dual-index address;
   wherein the dual index address points to different memory locations wherein one memory location stores tessellation weighting factors and another memory location stores vertex indices of the higher order triangular surface; and
   render a three-dimensional image for display using the new vertices of the tessellation triangle.

2. The method of claim 1 wherein said triangle-evaluation function is a Bezier function.

3. The method of claim 1 wherein storing the tessellation weighting factors of the higher-order triangular surface includes storing a set of weighting factors derived, in part, from Barycentric-coordinate system u, v, and w values.

4. The method of claim 1 wherein the dual-index address is comprised of a first component address that identifies the location of the vertex indices of the higher-order triangular surface and a second component, that identifies the location of a set of weighting factors.

5. The method of claim 4 wherein the first component address and the second component address are concatenated.

6. The method of claim 1 wherein calculating vertices of a tessellation triangle further includes calculating vertices for a plurality of tessellation triangles.

7. The method of claim 1 wherein storing the indices of the vertices of the higher order triangle includes storing hardware local indices of said vertices, said hardware local indices being relative offsets to a storage component of hardware termed constant memory.

8. The method of claim 1 including storing the new vertices at least temporarily and wherein rendering comprises generating display pixels based on the new vertices.

9. A method of tessellating a point-normal triangle that is used to model a graphical surface, said method carried out by a processor that provides graphics processing capability, said method comprising:
   storing, by the processor that provides graphics processing capability, Bezier-function, tessellation weighting factors;
   storing, by the processor that provides graphics processing capability, vertex indices of the point-normal triangular surface;
   calculating, by the processor that provides graphics processing capability, new vertices of a tessellation triangle for said point-normal triangle by evaluating a pre-determined Bezier function using the vertices of the point-normal triangle and weighting values that are identified by a dual-index address;
   wherein the dual index address points to different memory locations wherein one memory location stores tessellation weighting factors and another memory location stores vertex indices of the higher order triangular surface; and
   rendering a three-dimensional image for display using the new vertices of the tessellation triangle.

10. The method of claim 9 wherein said pre-determined Bezier function is at least one of: a linear Bezier function and a quadratic Bezier function and a cubic Bezier function.

11. The method of claim 9 wherein storing the tessellation weighting factors of the point-normal triangular surface includes storing a set of weighting factors derived, in part, from Barycentric-coordinate system u, v, and w values.

12. The method of claim 9 wherein the dual-index address is comprised of a first component address that identifies the location of the vertex indices of the point-normal triangular surface and a second component, that identifies the location of a set of weighting factors for said pre-determined Bezier function.

13. The method of claim 12 wherein the first component address and the second component address are concatenated.

14. The method of claim 9 wherein calculating vertices of a tessellation triangle further includes calculating vertices for a plurality of tessellation triangles.

15. The method of claim 9 further including rendering the graphic surface by processing each tessellated triangle through a standard graphics pipeline.

16. The method of claim 9 wherein storing the indices of the vertices of the point normal triangle includes storing hardware local indices of said vertices, said hardware local indices being relative offsets to a storage component of hardware termed constant memory.

17. A processor comprised of:
   an address fetch engine, for retrieving triangle-evaluation-function tessellation weighting factors using a first part of an address of a dual index address and for retrieving vertex indices of the higher-order triangular surface using a second part of an address of the dual index address;
   a cache memory, operatively coupled to said address fetch engine, for storing said weighting factors and said vertex indices of the higher-order triangular surface;
   a vertex shader processor, operatively coupled to the cache memory and receiving there from, said weighting factors and said vertex indices of the higher-order triangular surface;
   wherein the dual index address points to different memory locations wherein one memory location stores tessellation weighting factors and another memory location stores vertex indices of the higher order triangular surface, the vertex shader processor operative to calculate new vertices of a tessellation triangle for said higher-order triangular surface by evaluating said triangle-evaluation function using the vertices of the higher-order triangular surface and weighting values that are identified by the dual-index address; and
   a graphics pipeline operatively coupled to the vertex shader processor and operative to render a three-dimensional image for display using the new vertices of the tessellation triangle.

18. The processor of claim 17 wherein said address fetch engine is at least one of: a microcontroller; a digital signal processor; a microprocessor; combinational logic devices.

19. The processor of claim 17 wherein said cache memory is semiconductor memory.

20. The processor of claim 17 wherein said vertex shader processor is a digital signal processor.

* * * * *